United States Patent [19]

Brendel et al.

[11] Patent Number: 6,045,492

[45] Date of Patent: Apr. 4, 2000

[54] WEB PRESSING ROLLER

[75] Inventors: Bernhard Brendel, Grefrath; Günter Schrörs; Klaus Kubik, both of Tönisvorst, all of Germany

[73] Assignee: Eduard Küsters Maschinenfabrik GmbH & Co K.G., Krefeld, Germany

[21] Appl. No.: 09/230,402

[22] PCT Filed: Jul. 2, 1997

[86] PCT No.: PCT/DE97/01388

§ 371 Date: Jun. 11, 1999

§ 102(e) Date: Jun. 11, 1999

[87] PCT Pub. No.: WO98/04844

PCT Pub. Date: Feb. 5, 1998

[30] Foreign Application Priority Data

Jul. 25, 1996 [DE] Germany .......................... 196 29 967

[51] Int. Cl.[7] .................................................. B23P 15/00
[52] U.S. Cl. .................................................. 492/7; 492/20
[58] Field of Search .................. 492/7, 20, 38; 162/202, 203

[56] References Cited

U.S. PATENT DOCUMENTS

| | | | |
|---|---|---|---|
| 5,033,176 | 7/1991 | Schiel | 492/7 |
| 5,033,317 | 7/1991 | Van Haag | 492/7 |
| 5,290,223 | 3/1994 | Lehmann | 492/7 |
| 5,393,290 | 2/1995 | Lehmann et al. | 492/20 |
| 5,509,883 | 4/1996 | Niskanen et al. | 492/7 |
| 5,566,451 | 10/1996 | Niskanen et al. | 492/7 |
| 5,628,717 | 5/1997 | Van Haag | 492/20 |
| 5,679,107 | 10/1997 | Autrata et al. | 492/7 |
| 5,685,813 | 11/1997 | Kivioja et al. | 492/7 |
| 5,909,917 | 6/1999 | Kivioja et al. | 492/7 |
| 5,967,957 | 10/1999 | Küsters | 492/20 |

FOREIGN PATENT DOCUMENTS

| | | |
|---|---|---|
| 25 02 161 | 7/1976 | Germany . |
| 25 22 657 | 11/1976 | Germany . |
| 35 28 333 | 2/1987 | Germany . |
| 92 05 796 | 8/1993 | Germany . |
| 93 14 568 | 2/1995 | Germany . |
| 195 27 225 | 1/1997 | Germany . |

Primary Examiner—David P. Bryant
Assistant Examiner—Marc W. Butler
Attorney, Agent, or Firm—Kenyon & Kenyon

[57] ABSTRACT

A roller is provided for a pressure treatment of a web of paper, textile, plastic film, and is composed of a rotary hollow cylinder which can be distinctly deformed under the effect of line forces in the roll nip. The roller includes a non-rotary cross-head which penetrates the rotary hollow cylinder over its length. On the side of the roll nip, hydraulic supporting elements are provided which can be pressed against the inside circumference of the hollow cylinder in the manner of piston/cylinder units. These supporting elements have a length of not more than 20 cm in the longitudinal direction of the cross-head, and are closely arranged next to one another in the longitudinal direction of the cross-head. The supporting elements can be driven independently of one another at least in several groups. A sealing strip is also provided which continues in one piece over several supporting elements. The supporting elements rest against the sealing strip from below, and the sealing strip acts against the inside circumference of the hollow cylinder, at the top. At the top, the sealing strip has a bearing pocket above each supporting element. The edges at the adjacent sides of bearing pockets which follow one another in the longitudinal direction of the roller are formed by a transverse edge common to both bearing pockets.

18 Claims, 3 Drawing Sheets

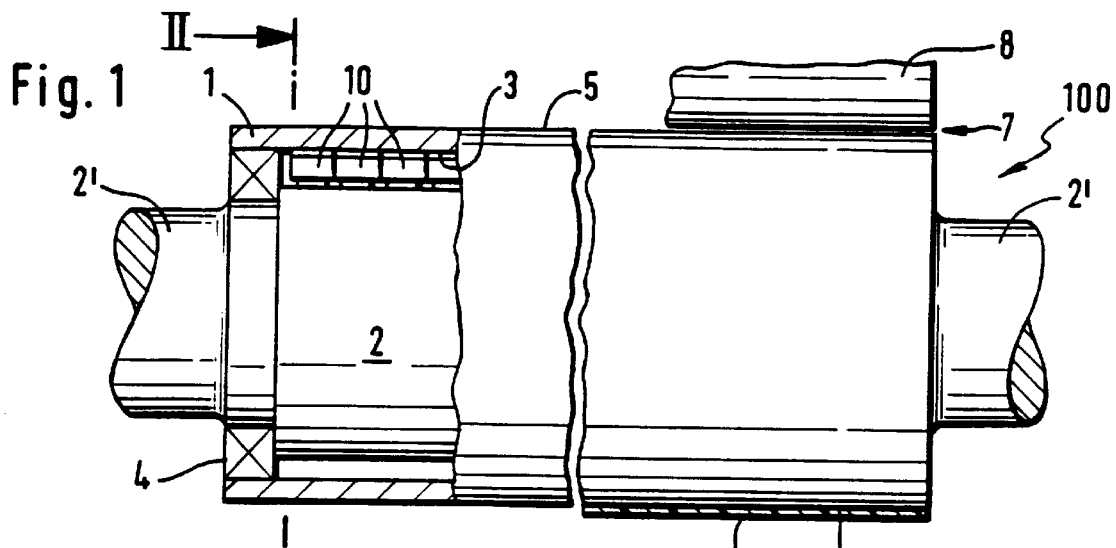
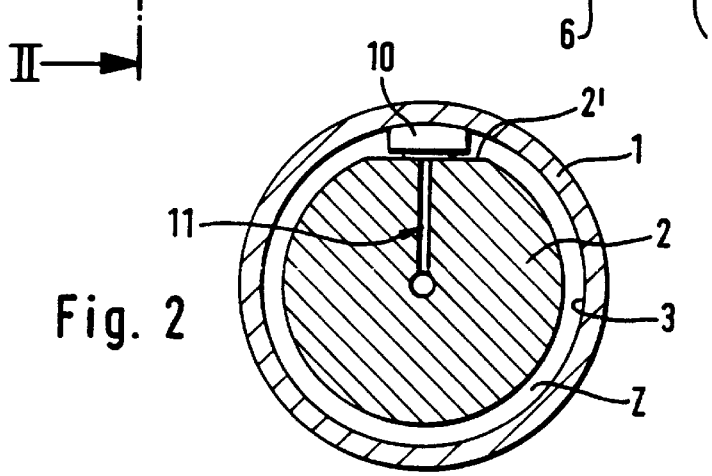
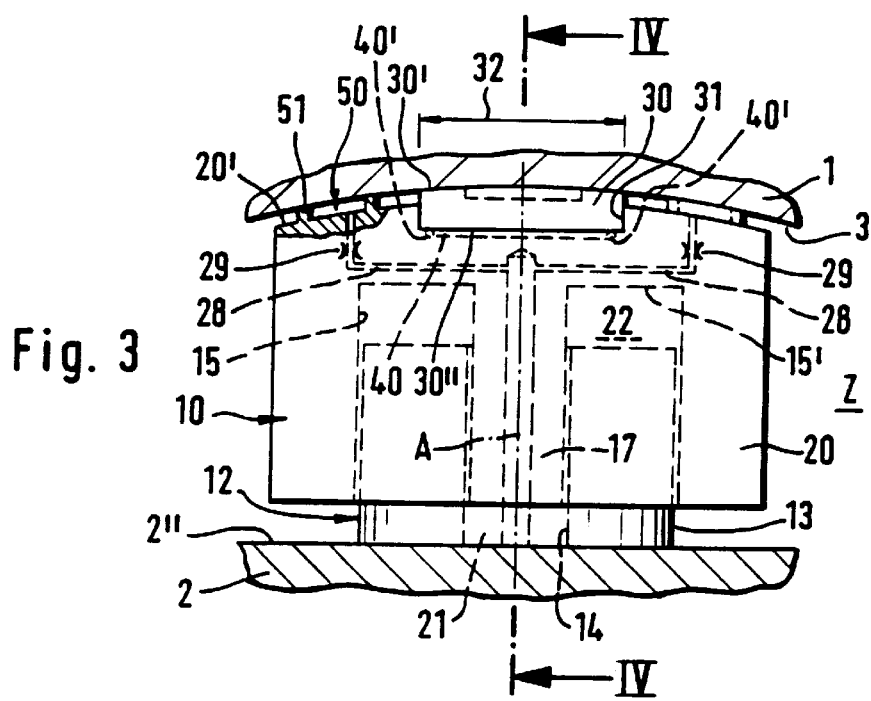

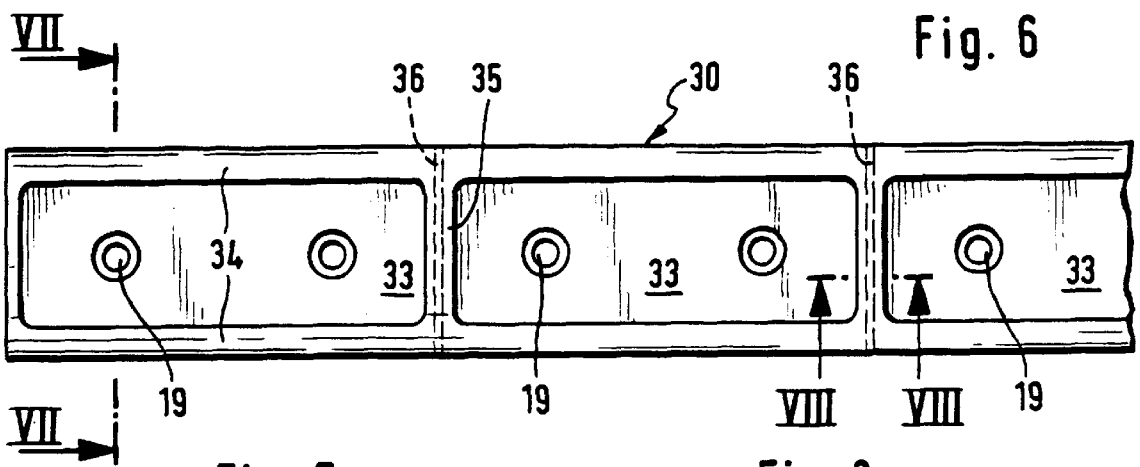
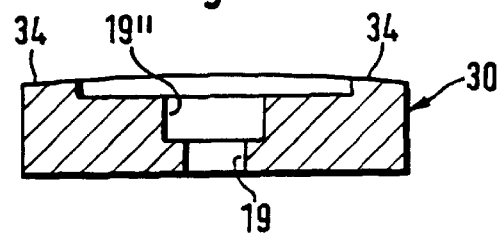
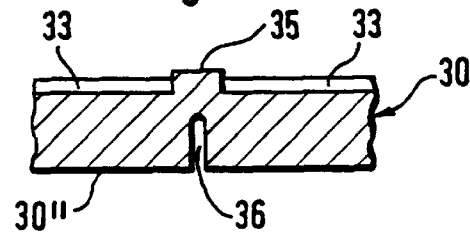
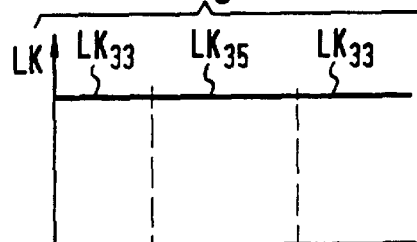
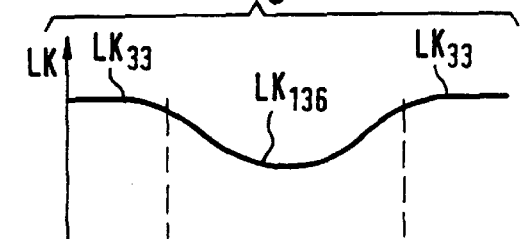
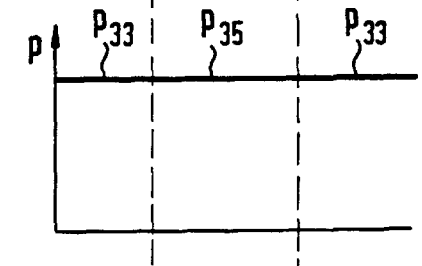
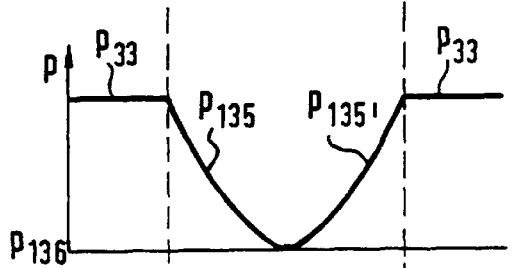
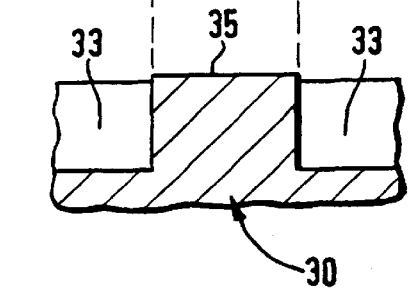
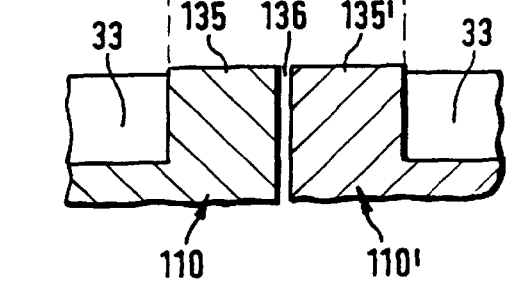

WEB PRESSING ROLLER

The present invention relates to a roller corresponding to the type of the preamble of claim 1.

Such a roller is known from German Patent GM 93 14 568. In the known roller, the supporting elements rest against the inside circumference of the hollow cylinder with the edges of bearing pockets which are formed on these elements themselves. Supporting elements which are adjacent to one another in the longitudinal direction of the roller follow each other directly. The bearing pockets extend on the adjacent sides of the supporting elements which follow one another in the longitudinal direction of the roller, directly to the edge of the supporting element, so that the minimum possible distance exists between two consecutive bearing pockets. In the implementation of rollers of the type corresponding to German Patent-GM 93 14 568, it was found, however, that the hollow cylinders used, made of fiber-reinforced plastic with a wall thickness of 15 to 20 mm, can be formed in such a way that the transition points from one supporting element to the next supporting element in the longitudinal direction of the roller are distinctly marked in the line pressure progression. The hydraulic pressure in the bearing pockets drops to zero, from the value which prevails in the bearing pocket, transverse to the edge, and then increases from zero to the pressure in the next bearing pocket, at the edge of that bearing pocket. This pressure drop on the inside circumference of the hollow cylinder can still be felt on its outside circumference, because of the resilience of the hollow cylinder.

The present invention is based on the task of structuring a roller of the type of the preamble in such a way that the pressure drops at the transitions of consecutive supporting elements, in the longitudinal direction of the roller, are avoided.

This task is accomplished by the invention reproduced in claim 1.

In the following, when "top" is mentioned, this refers to the leading edge in the direction of effect of the supporting elements, which moves toward the inside circumference of the hollow cylinder when pressure is applied. This corresponds to the arrangement shown in the drawing, where the roller according to the invention is the bottom roller.

The difference as compared with the known roller is that the bearing pockets are no longer formed on each individual supporting element itself, but rather on a continuous "sealing strip" which is arranged in the longitudinal direction of the roller and carries a number of bearing pockets corresponding to the number of supporting elements, which pockets are provided at the locations of the supporting elements and extend over their longitudinal expanse.

The invention is already implemented if a continuous sealing strip with several bearing pockets extends over several consecutive supporting elements in the longitudinal direction of the roller; in the preferred exemplary embodiment, however, it is provided that the sealing strip continues over the entire length of the roller.

In the roller known from German Patent GM 93 14 568, the pressure always dropped to zero or at least to a low value at the face edge of the bearing pocket in each instance, because the edge bordered freely on the interstice between the cross-head and the inside circumference of the roller. With the arrangement of consecutive bearing pockets in the longitudinal direction of the roller on the sealing strip, however, the possibility of giving the adjacent bearing pockets in the longitudinal direction of the roller a common edge is created. On this edge, the pressure of the bearing pockets and therefore also the pressure exerted against the inside circumference of the hollow cylinder remains essentially the same, because the pressure of the bearing pockets is exerted from both sides and no pressure gradient exists. If the pressure in the bearing pockets is the same in adjacent bearing pockets in the longitudinal direction of the roller, this strictly holds true. If the pressure in the bearing pockets is slightly different, the pressure along the common edge drops from the higher value to the lower value, but in no event does it drop below this value.

In this manner, the pressure drops which are distinctly marked in the line force progression of the roller disappear, and the line force exerted by consecutive supporting elements, which can be driven independent of one another, can be made uniform, even in the case of relatively soft hollow cylinders.

Of course, the shape rigidity of the sealing strip at the transitions between the individual supporting elements also contributes, purely mechanically, to evening out the line pressure progression. The sealing strip also prevents overly high surface pressures at the edges of adjacent supporting elements to which different pressures are applied. However, the sealing strip is not allowed to be too stiff, because otherwise it would prevent sensitive application of pressure by independent drive of the consecutive supporting elements in the longitudinal direction of the roller.

A sealing strip which extends continuously over the length of the roller, with a bearing pocket, is actually known from German Patent 25 02 161 A1. However, this sealing strip is not supported by individual supporting elements which can be driven separately, but rather by a rod-shaped piston which extends continuously over the length of the roller, by means of which only a pressure force which is the same over the entire length can be exerted. The bearing pocket also extends over the entire length of the roller, so that only a uniform hydrostatic pressure can act against the inside circumference of the hollow cylinder. The problem of the invention, which is connected with the presence of separate, individual, consecutive supporting elements, therefore does not exist in German Patent 25 02 161 A1.

In German Patent 35 28 333 C2, a continuous sealing strip also exists, which can even be supported by individual supporting elements, but these do not follow each other directly in the longitudinal direction of the roller. In German Patent 35 28 333 C2, the bearing pocket formed on the sealing strip is also structured to be continuous over the entire length of the roller, so that the possibility of exerting separate pressures along the roller, which is an aim of the invention, does not exist.

In order to increase the adaptability of the sealing strip to the pressures exerted by the supporting elements, without thereby endangering the stability of the sealing strips as a whole and possibly that of the bearing pockets formed on them, a bending ability and therefore a reduction in cross-section which promotes flexibility, according to claim 2, is recommended, and in practice this can be achieved by a groove, in the manner reproduced in claim 3.

The sealing strip can be held on the top of the supporting elements, in the manner reproduced in claim 4.

In the embodiment which comes into primary consideration, the supporting elements can have a rectangular footprint in the plane perpendicular to their direction of effect, and the bearing pockets can be narrower than the supporting element bodies in the circumference direction, as in claim 5.

The narrower formation of the bearing pockets in the circumference direction is supposed to have the effect of preventing the hollow cylinder from pressing in, in the region of the bearing pocket which is under greater stress, under the effect of the line force, which could lead to increased pressure forces and wear at the edges of the edge regions.

The support pocket according to claim 6 is supposed to result in at least partial hydraulic stress relief of the sealing strip.

If the active surface of the sealing strip is at least as great, according to claim 7, as the active surface of the related bearing pocket, hydraulic stress relief can even be achieved completely, if the supporting pocket is filled with pressure fluid under the same pressure as the related bearing pocket (claim 8).

This can be brought about, in design terms, in simple manner, in the manner reproduced in claim 9, where the pressure fluid to supply the bearing pockets can simultaneously be utilized for hydraulic stress relief.

If hydraulic stress relief is complete, i.e. if the sealing strip "floats" on the pressure fluid in the supporting pockets, the sealing strip can make particularly complete contact with the progression of the inside circumference of the hollow cylinder.

In the present invention, the supporting elements are supposed to be driven in smaller groups of several supporting elements in each instance, or preferably individually. Such a drive can be achieves relatively easily in the manner reproduced in claim 10. The force exerted by each individual supporting element is determined by the hydrostatic pressure in the cylinder chambers of the individual supporting elements, which are closed except for the feed lines. To change this pressure, only very small volumes are required, and these can be provided by feed lines with a very small cross-section. If the bearing pockets are connected with a single feed line, only this line needs to be able to carry larger amounts of pressure fluid.

An important development in the type of supporting elements described is the stabilization pockets of claim 11, which each have only a significantly smaller footprint cross-section than the bearing pocket itself, and therefore do not use up a lot of pressure fluid, so that pressure control of the cylinder chamber from which the stabilization pockets obtain their pressure fluid is not influenced to a noteworthy degree.

The present invention is primarily provided for rollers with hollow cylinders, which can be deformed relatively easily. It is true that in operation, they are supposed to maintain their tubular shape and not "flutter," but they should be so deformable that they permit a non-constant pressure profile of the supporting elements to "get through" and can easily make intimate contact with a counter-roller.

In view of this aspect, the material of the hollow cylinder should have a modulus of elasticity which is at most half of the modulus of elasticity of steel, as per claim 12.

In particular, dimensions according to claim 13 are possible.

In the preferred exemplary embodiment of the present invention, the "hollow cylinder which can be distinctly deformed under the effect of the line forces in the roll nip" is made of a fiber-reinforced plastic (claim 14).

In the preferred exemplary embodiment of the present invention (claim 15), the modulus of elasticity is different in the longitudinal direction and the circumference direction of the hollow cylinder, as can be achieved in the manner reproduced in claim 16.

A roller with a hollow cylinder made of rubber-elastic material with reinforcement inserts is known from German Patent PS 25 22 657. Here, however, the inserts are not arranged in three layers, as in the manner according to the invention, which has the purpose here of preventing a stiffening sandwich effect with regard to bending in a plane which passes through the axis.

The influence of the winding direction on the modulus of elasticity of roller cylinders made of plastic resin with wound fiber reinforcement is actually known from the company publication "Walzen in Leichtbauweise . . . ein Produkt von Freudenberg" by the Carl Freudenberg company in 69469 Weinheim, Germany.

Fiber-reinforced plastics do not always offer optimum slip characteristics on their outside surface. For this reason, it is recommended to provide a slip-promoting layer on the inside circumference of the hollow cylinder, as per claim 17, which simultaneously prevents the hydraulic fluid from making direct contact with the resin material of the hollow cylinder, and possibly entering into chemical reactions there, in the long run.

On the outside of the hollow cylinder, a coating of an elastomer material can be provided, as per claim 18, in known manner.

BRIEF DESCRIPTION OF THE DRAWINGS

The drawing shows an exemplary embodiment of the invention.

FIG. 1 shows a schematic view of a roller according to the invention, partially in cross-section;

FIG. 2 shows a cross-section through the roller according to FIG. 1, along line II—II;

FIG. 3 shows an enlarged view of the top part of FIG. 2;

FIG. 6 shows a view from above of the sealing strip by itself; the sealing strip can be seen in FIG. 5;

FIG. 7 shows a cross-section along line VII—VII on an enlarged scale;

FIG. 8 shows a section along line VIII—VIII in FIG. 6;

FIGS. 9a), b), and c) as well as 10a), b), and c) show a comparison of the pressure conditions at the abutment points between consecutive supporting elements in a roller according to the state of the art and in a roller according to the invention, on an enlarged scale.

DETAILED DESCRIPTION

Figure 4:
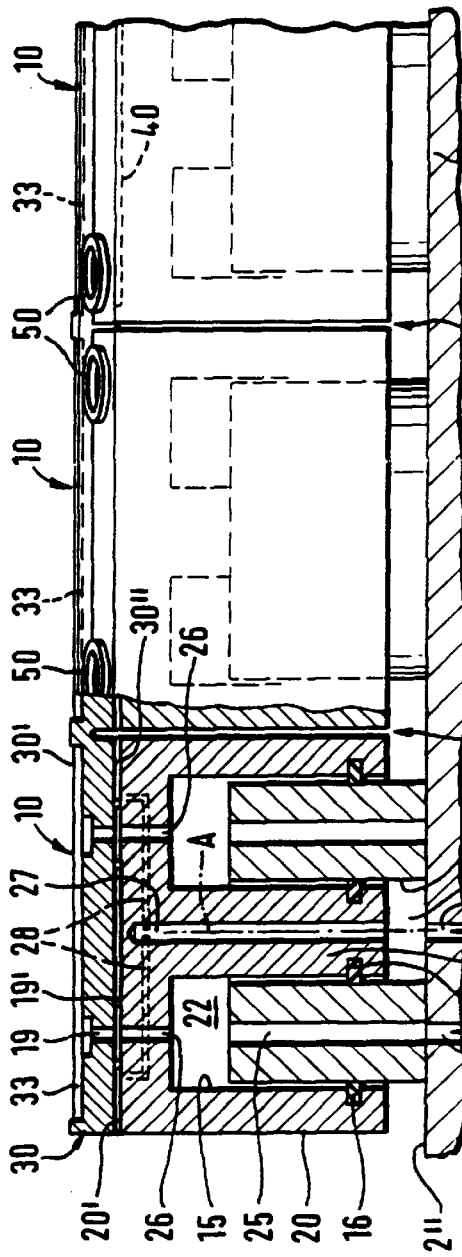
FIG. 4 shows a view of the top part of the roller according to FIG. 1, partially in cross-section along line IV—IV in FIG. 3.

The roller indicated as a whole as 100 in FIG. 1 is composed of a hollow cylinder 1 through which a non-rotary cross-head 2 penetrates over its length, which cross-head leaves a distance from inside circumference 3 of hollow cylinder 1 all around, and is supported in a roller stand or in the rockers of a calander at projecting ends 2', in a manner not shown. Hollow cylinder 1 is mounted, at its ends, to rotate on cross-head 2, on bearings 4. Its outside circumference 5 forms the working roller circumference, which interacts with a counter-roller 8, which is only indicated by a small portion, in a roll nip 7 which is located at the top in the exemplary embodiment, in order to subject a paper web, not shown, or the like to a calander treatment or similar treatment. For this purpose, hollow cylinder 1 can also have a coating 9 of elastomer material, for example a suitable plastic, as indicated at the bottom right of FIG. 1, whose outside circumference 6 then forms the working roller circumference.

Hollow cylinder 1 itself is made from a fiber-reinforced plastic tube which has a wall thickness of 15 to 20 mm, with the usual roller diameter of 40 to 60 cm, and has a smooth, slip-promoting coating sealed against pressure fluid on its inside circumference 3.

In the interstice Z between the outside circumference of cross-head 2 and inside circumference 3 of hollow cylinder 1, hydrostatic supporting elements 10 are arranged on cross-head 2, on the side facing roll nip 7, which follow each other closely in the longitudinal direction of roller 100, and are supplied with pressure fluid via a feed system designated as a whole as 11 in FIG. 2, inside cross-head 2, and exert an upward force, as a function of this pressure, against inside circumference 3 of hollow cylinder 1 in the direction of roll nip 7.

Figure 5:
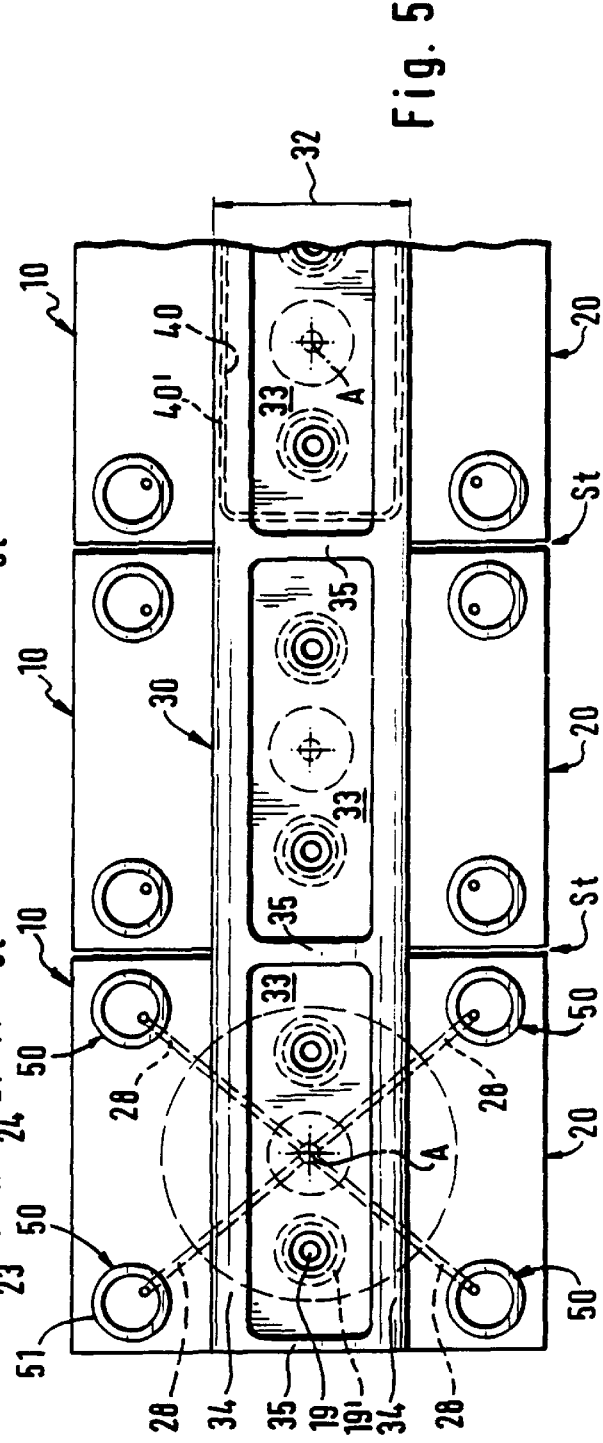
FIG. 5 shows a view according to FIG. 4, from above.

The structure of supporting elements 10 and feed system 11 is shown in detail in FIGS. 3 to 5. Each supporting element 10 is composed of a ring piston 12 and a supporting element body 20. Ring pistons 12 possess a cylindrical outside circumference surface 13 and a cylindrical inside circumference surface 14 coaxial to axis A of the former. They are arranged on the flattened top 2" of cross-head 2, with their axis A perpendicular to this top, in a row which runs in the longitudinal direction of roller 100. Supporting element body 20, as shown in FIG. 5, has a rectangular footprint in a plane perpendicular to axis A, but supporting element body 20 possesses a cylinder bore 15 at its bottom, facing cross-head 2, which interacts with the cylindrical outside circumference 13 of ring piston 12 via seals 16 (FIG. 4). A cylindrical projection 17, coaxial to axis A, extends downward from bottom 15' of cylinder bore 15 to the bottom edge of supporting element body 20, which projection interacts with the cylindrical inside circumference 14 of ring piston 12 via a seal 18. Supporting element body 20 can therefore be displaced relative to ring piston 12, in the direction of axis A, with a cylinder chamber 21 being formed below cylindrical projection 17 and a cylindrical ring chamber 22 being formed above ring piston 12.

In order to be able to bring about a line force profile in roll nip 7 which can be adjusted as precisely as possible, the expanse of supporting element bodies 20, to which zones correspond in which constant force is exerted in the longitudinal direction, in the configuration shown, is limited. In general, supporting element bodies 20 are therefore not longer than 20 cm and can have a shorter length of as little as 10 cm, with roller lengths on the order of 4 to 10 m. These supporting element bodies 20 follow one another as closely as possible, and therefore form a precisely subdivided row of separately driven force exertion points.

Two types of feed lines for pressure fluid are provided in cross-head 2, composed of one feed line 23 for each supporting element 10, to supply the bearing pockets which will be described below, and a feed line 24 which opens into cylinder chamber 21. Feed line 23 is connected with ring chamber 22 via a non-throttled channel 25 in ring piston 12; in the exemplary embodiment, two non-throttled channels 26, which are located one behind the other in the longitudinal direction of roller 100, run from feed line 23 to top 20' of supporting element body 20. Feed lines 23 can be connected with a common feed channel with a larger cross-section, located in cross-head 2. The totality of these lines forms the feed line system 11 which is shown in simplified form in FIG. 2.

A channel 27 is also provided in cylindrical projection 17, which channel opens into cylinder chamber 21 and which is closed at the top end, except for branch lines 28, in which throttle points 29 are arranged (FIG. 3), which depart from there.

Top 20' of supporting element body 20, which faces inside circumference 3 of hollow cylinder 1, has an arc with a somewhat smaller radius than the one which inside circumference 3 of hollow cylinder 1 has, so that it maintains a uniform distance of a few millimeters from inside circumference 3.

Circular stabilization pockets 50 are provided at the four corners of the rectangular footprint of supporting element body 20, into which pockets branch lines 28 lead, and which are surrounded by circular edge 51, the top of which is shaped corresponding to inside circumference 3 of hollow cylinder 1, and rests there, forming a seal.

Supporting element bodies 20 furthermore have rectangular grooves 31 on their top, which align in the longitudinal direction of roller 100, with a width 32, which grooves hold a sealing strip 30 which extends continuously, in one piece, over all supporting elements 10 which are present. In top 30' of sealing strip 30, which top faces inside circumference 3 of hollow cylinder 1, a bearing pocket 33 in the shape of a flat, rectangular depression is provided above each supporting element 10, which pocket is delimited by longitudinal edges 34 at the longitudinal edges of sealing strip 30, and by transverse edges 35, which are each arranged at the level of abutment points St between supporting element bodies 20 of adjacent supporting elements 10. The top of edges 34, 35 is shaped to correspond to inside circumference 3 of hollow cylinder 1, so that edges 34, 35 can rest against inside circumference 3 of hollow cylinder 1, forming a seal. Sealing strip 30 has non-throttling perforations 19 at each supporting element 10, which perforations pass through from bearing pocket 33, in each instance, to bottom 30" of sealing strip 30, and which align with channels 26 in top 20' of supporting element body 20, in each instance. The transition region is sealed with a surrounding O-ring 19', so that the pressure fluid cannot escape between top 20' of supporting element 20 and bottom 30" of sealing strip 30.

Stabilization pockets 50 are supplied via branch lines 28 with throttle point 29. The pressure fluid supplied to the inside of stabilization pockets 50 flows out over edge 51. If the distance is increased, the out-flow cross-section is increased and the pressure drops due to throttle point 29. Stabilization pocket 50 in question then approaches inside circumference 3 of hollow cylinder 1 again, causing the outflow cross-section to be reduced and the pressure to increase. In this manner, an equilibrium is reached, where edge 51 automatically is kept at a certain slight distance from inside circumference 3 of hollow cylinder 1, and remains separated from inside circumference 3 by a supporting film of fluid.

This function is performed by all four stabilization pockets 50 which can be seen in FIG. 5, so that supporting element body 20, which is held against seals 16, 18 in such a manner as to tumble slightly, and can adjust its position relative to inside circumference 3 of hollow cylinder 1, is always kept in a defined position relative to inside circumference 3.

The tops of edges 51 and 34, 35, respectively, are structured in such a way that they are all located on a common cylinder surface, which corresponds to inside circumference 3 of hollow cylinder 1. The pressure fluid supplied to bearing pockets 33 flows out in the circumference direction via edges 34, which run in the longitudinal direction, because there is a gradient between the pressure in bearing pockets 33 and the pressure prevailing at the outside edge of each edge 34 which runs in the longitudinal direction, in interstice Z between inside circumference 3 of hollow cylinder 1 and cross-head 2.

In FIG. 3 and on the right side of FIGS. 4 and 5, in each instance, a modification is indicated, which includes a flat supporting chamber 40 with a depth of a few millimeters, under bearing pocket 33, in each instance, in the bottom of groove 31 at top 20' of supporting element body 20, in each instance. Supporting chamber 40 has an essentially rectangular footprint in a plane perpendicular to axis A, and an effective surface which at least corresponds to the effective surface of related bearing pocket 33, and tends to be somewhat greater. In other words, a bearing pocket 33 and a supporting pocket 40 below it are arranged, in each instance, so that they are located above one another. When there are supporting pockets 40, O-rings 19' at the transition points of channels 26 and perforations 19 are not necessary, and instead a closed seal 40' runs entirely around supporting pocket 40, in each instance. Channels 26 therefore run into supporting pocket 40, and perforations 19 also proceed from supporting pocket 40. In this manner, supporting pocket 40 fills with pressure fluid under the same pressure as bearing pockets 33. If the effective surfaces are dimensioned appropriately, sealing strip 30 "floats" on the pressure fluid in supporting pocket 40 and can adapt its location in the inside circumference 3 of hollow cylinder 1 very easily. Seal 40' is a string seal or a lip seal, which remain tight since the displacements of sealing strip 30 relative to supporting element body 20, in each instance, are slight.

FIG. 6 shows sealing strip 30 separately. Each bearing pocket 33 has two perforations 19 at its bottom, which open into bearing pocket 33 with a step-like widened region 19", and align with channels 26 in supporting element body 20.

An important point is that while each bearing pocket 33 has two of its own edges 34 which run in the longitudinal direction, transverse edges 35 of bearing pockets 33, 33 which follow one another in the longitudinal direction of roller 100 are formed in common and by a single, closed ridge, as is evident from FIG. 8.

Supporting element bodies 20 are pressed against inside circumference 3 of hollow cylinder 1 under the force of the pressure fluid which is present in cylinder chamber 21, where supporting element bodies 20 rest against inside circumference 3 not directly, but via sealing strip 30.

In order for sealing strip 30 to be able to make contact with hollow cylinder 1 from the inside as intimately as possible, its bending resistance at the level of abutment points St, between individual supporting elements 10, is reduced by a transverse groove 36 which is worked in from bottom 30" of sealing strip 30, and extends up to about half the thickness of sealing strip 30 (FIG. 8). Above transverse groove 36, however, transverse edge 35 bridges abutment point St between individual supporting elements 10. Transverse grooves 36 are not shown in FIG. 5.

The significance of common transverse edge 35 is explained using FIGS. 9 and 10. FIG. 9 represents the state of the art, in which supporting elements 110 and 110' follow one another in the longitudinal direction of the roller. Supporting elements 110, 110' each have bearing pockets 33, which are delimited by edges which run in the longitudinal direction and transverse edges 135, 135'. Each bearing pocket 33 therefore has its own transverse edges 135, i.e. 135', which are directly adjacent at abutment point St, but leave a gap 136 between them, which is connected with interstice Z.

FIG. 9b shows the progression of the pressure in the pressure fluid. In the region of bearing pockets 33 it has the value $P_{33}$, which is the same in the two consecutive bearing pockets 33 in the exemplary embodiment. The pressure fluid flows out of bearing pocket 33, in each instance, over transverse edges 135, i.e. 135', to the outside, into gap 136. In gap 136, the pressure of the interstice prevails, i.e. the pressure is zero or at least a lower pressure than in bearing pockets 33. In other words, the pressure drops above transverse edges 135, 135', in the longitudinal direction of the roller, in accordance with curves $P_{135}$ and $P_{135'}$, to the value $P_{136}$. Therefore a pressure drop occurs at abutment point St, in accordance with FIG. 9b. This pressure drop at inside circumference 3 of hollow cylinder 1 is slightly ameliorated by its shape rigidity, but after all, the shape rigidity of hollow cylinder 1 is supposed to be limited. It therefore cannot fully compensate for the pressure drop on the inside, rather a line force progression with a less distinctly marked sink will occur on the outside circumference 5 of hollow cylinder 1, as reproduced by curve $LK_{136}$, in FIG. 9c. The abutment points between individual supporting elements 10 are accordingly evident in strip form on the substrate passed through roll nip 7 for treatment. Of course this does not hold true for a hollow cylinder made of steel and having a thick wall, but only for hollow cylinders 1 made of fiber-reinforced plastic or aluminum, with relatively thin walls, which are resilient to a certain degree and should be present in roller 100.

FIG. 10 represents the embodiment modified by sealing strip 30, according to the invention. Sealing strip 30 does not have any abutment points St corresponding to the abutment point in FIG. 9a, but rather bridges abutment point St between supporting element bodies 20. There is therefore no out-flow for the pressure fluid present at transverse edge 35 of bearing pockets 33 which corresponds to gap 136 of FIG. 9a. Since there is no out-flow of pressure fluid in the longitudinal direction of roller 100, no pressure drop occurs at transverse edge 35, i.e. the line force $LK_{33}$ produced in the region of bearing pockets 33 remains constant, even over abutment point St: $LK_{33}=LK_{35}$.

This result is achieved in that sealing strip 30 bridges abutment points St between supporting element bodies 20, which can, for the remainder, be moved separately and independent of one another in the direction of effect. This is absolutely necessary for separate drive of individual supporting elements 10. In the invention, this separate drive and corresponding ability to select a line force distribution is combined with avoiding pressure drops at abutment points St.

We claim:

1. A roller for pressure treating a web composed of one of a paper material, a textile material, a plastic film and a similarly composed material, comprising:

a rotary hollow cylinder forming a working roller circumference, the working roller circumference being deformable under an effect of line forces in a roll nip;

a non-rotary cross-head penetrating the rotary hollow cylinder over a length of the rotary hollow cylinder, the non-rotary cross-head having a predetermined radial distance from an inside circumference of the rotary hollow cylinder, the non-rotary cross-head being supported by external supports on end portions of the non-rotary cross-head;

hydraulic supporting elements arranged on the non-rotary cross-head and on a side of the roll nip in at least one longitudinal row, the hydraulic supporting elements having a form of piston/cylinder units and being pressable against the inside circumference of the rotary hollow cylinder with a pressure fluid, the hydraulic supporting elements having a length of at most 20 cm in a longitudinal direction of the non-rotary cross-head, one of the hydraulic supporting elements being closely arranged to another one of the hydraulic supporting elements in the longitudinal direction of the non-rotary cross-head, the hydraulic supporting elements being drivable independently from one another in at least a predetermined number of groups of the hydraulic supporting elements; and at least one flexible sealing strip extending over at least two elements of the hydraulic supporting elements which follow one another in the longitudinal direction of the non-rotary cross-head, the at least one flexible sealing strip being disposed on the at least one longitudinal row of the hydraulic supporting elements, wherein the hydraulic supporting elements contact a bottom portion of the at least one flexible sealing strip so that the at least one flexible sealing strip acts against the inside circumference of the rotary hollow cylinder via a top portion of the at least one flexible sealing strip, wherein each of the at least one flexible sealing strip has, at the top portion, a respective bearing pocket which includes at least one edge fully extending around the respective bearing pocket, the respective bearing pocket being open toward the inside circumference of the rotary hollow cylinder and being disposed above a top side of a respective element of the hydraulic supporting elements, the respective bearing pocket being fillable with the pressure fluid to support the rotary hollow cylinder, the at least one edge being disposed against the inside circumference of the rotary hollow cylinder, wherein the pressure fluid constantly flowing over the at least one edge to at least one particular location and forming a liquid film at the at least one particular location to support the rotary hollow cylinder, wherein the at least one flexible sealing strip has perforations which extend from the bottom portion to the top portion of the at least one flexible sealing strip and open into the bearing pockets, the perforations being connected to feed channels of the hydraulic supporting elements for receiving the pressure fluid from the hydraulic supporting elements, at least one of the feed channels being connected to a respective feed line provided in each of the hydraulic supporting elements, wherein a first strip of the at least one flexible sealing strip follows a second strip of the at least one flexible sealing strip in a longitudinal direction of the roller, the at least one edge of the respective bearing pocket of the first strip has a first side which is adjacent to a second side of the at least one edge of the respective bearing pocket of the second strip, the first and second sides being formed by a transverse edge of the respective bearing pockets of the first and second strips, wherein the hydraulic supporting elements have a length of at most 20 cm in the longitudinal direction of the rotary cross-head, and wherein the feed channels and the perforations are throttle-free.

2. The roller according to claim 1, wherein a cross-section of the at least one flexible sealing strip is reduced at an abutment point level to increase a flexibility of the at least one flexible sealing strip, the at least one flexible sealing strip being reduced at a transition region between a first element of the hydraulic supporting elements and a second element of the hydraulic supporting elements adjacent to the first element in the longitudinal direction of the roller.

3. The roller according to claim 2, wherein the cross-section is reduced by providing a groove at the bottom portion of the at least one flexible sealing strip, the groove extending over a width of the at least one flexible sealing strip and over a portion of a height of the at least one flexible sealing strip.

4. The roller according to claim 1, wherein at least one of the hydraulic supporting elements includes a supporting element body which has a rectangular periphery in a plane perpendicular to an effect direction of the supporting element body, the respective bearing pocket being narrower than the supporting element body in a circumferential direction, and further comprising:

four stabilization pockets provided for each of the hydraulic support elements, each of the stabilization pockets having a completely enclosing edge, the stabilization pocket being disposed on the supporting element body, outside of a rectangular periphery of the respective bearing pocket and substantially close to corners of the rectangular periphery, the stabilization pockets communicating with a cylinder space via throttled feed lines, the cylinder space communicating with a further feed line in the non-rotary cross-head.

5. The roller according to claim 1, wherein at least one element of the hydraulic supporting elements includes a flat supporting pocket at the top side of the at least one element which supports the at least one flexible sealing strip, the flat supporting pocket being fully sealed at the bottom portion of the at least one flexible sealing strip and being fillable with the pressure fluid.

6. The roller according to claim 5, wherein the flat supporting pocket of the at least one element has a first active surface which is substantially equal to a second active surface of the respective bearing pocket of the at least one element.

7. The roller according to claim 5, wherein the flat supporting pocket of the at least one element is fillable with the pressure fluid under a first pressure which is substantially equal to a second pressure of the pressure fluid provided in the respective bearing pocket of the at least one element.

8. The roller according to claim 7, wherein the feed channels which supply the respective bearing pocket open into the flat supporting pocket, and wherein the perforations of the at least one flexible sealing strip which lead to the respective bearing pocket extend from the flat supporting pocket.

9. The roller according to claim 1, wherein the rotary hollow cylinder is composed of a particular material having a degree of elasticity which is at most half of a degree of elasticity of a steel material.

10. The roller according to claim 9, wherein the rotary hollow cylinder has a radial wall thickness which is less than 20 mm, and wherein the degree of elasticity of the particular material is less than 100,000 N/mm$^2$ in a longitudinal direction of the rotary hollow cylinder.

11. The roller according to claim 9, wherein the particular material is a fiber-reinforced plastic material.

12. The roller according to claim 11, wherein the fiber-reinforced plastic material includes one of wound endless fibers and endless fiber aggregates, the fiber-reinforced plastic material being structured in three particular layers, wherein first fibers of radially external layers of the particular layers have a first winding angle of approximately 15° with respect to a circumference direction of the rotary hollow cylinder, and wherein second fibers of a middle layer of the particular layers have a second winding angle of approximately 15° relative to a longitudinal direction of the rotary hollow cylinder.

13. The roller according to claim 12, wherein the particular layers include a slip-promoting layer which is sealed from the pressure fluid on the inside circumference of the rotary hollow cylinder.

14. The roller according to claim 10, wherein the rotary hollow cylinder has a coating composed of an elastomer material on an outside circumference of the rotary hollow cylinder.

15. The roller according to claim 1, wherein the rotary hollow cylinder is composed of a particular material, the particular material having a first degree of elasticity in a longitudinal direction of the rotary hollow cylinder and a second degree of elasticity in a circumference direction of the rotary hollow cylinder, the first degree of elasticity being less than the second degree of elasticity.

16. The roller according to claim 15,
wherein the particular material includes one of wound endless fibers and endless fiber aggregates, the particular material being structured in three particular layers,
wherein first fibers of radially external layers of the particular layers have a first winding angle of approximately 15° with respect to a circumference direction of the rotary hollow cylinder, and
wherein second fibers of a middle layer of the particular layers have a second winding angle of approximately 15° relative to a longitudinal direction of the rotary hollow cylinder.

17. The roller according to claim 15, wherein the rotary hollow cylinder has a slip-promoting layer which is sealed from the pressure fluid on the inside circumference of the rotary hollow cylinder.

18. The roller according to claim 15, wherein the rotary hollow cylinder has a coating composed of an elastomer material on an outside circumference of the rotary hollow cylinder.

* * * * *